(12) United States Patent
Harpur et al.

(10) Patent No.: US 10,616,532 B1
(45) Date of Patent: Apr. 7, 2020

(54) BEHAVIORAL INFLUENCE SYSTEM IN SOCIALLY COLLABORATIVE TOOLS

(71) Applicant: INTERNATIONAL BUSINESS MACHINES CORPORATION, Armonk, NY (US)

(72) Inventors: Liam S. Harpur, Dublin (IE); Brett Ward, Raleigh, NC (US); Mark Delaney, Raleigh, NC (US); Robert H. Grant, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/144,112

(22) Filed: Sep. 27, 2018

(51) Int. Cl.
  *H04N 7/15* (2006.01)
  *G06K 9/00* (2006.01)
  *H04L 12/18* (2006.01)

(52) U.S. Cl.
  CPC ......... *H04N 7/155* (2013.01); *G06K 9/00302* (2013.01); *G06K 9/00744* (2013.01); *H04L 12/1822* (2013.01); *H04L 12/1831* (2013.01)

(58) Field of Classification Search
  USPC ...................................... 348/14.01
  See application file for complete search history.

(56) References Cited

U.S. PATENT DOCUMENTS

| | | | |
|---|---|---|---|
| 5,722,418 A | 3/1998 | Bro et al. | |
| 8,243,116 B2 | 8/2012 | Qvarfordt et al. | |
| 9,332,227 B2 | 5/2016 | Cunico et al. | |
| 9,437,215 B2 | 9/2016 | Conway et al. | |
| 9,792,490 B2 | 10/2017 | Bathiche et al. | |
| 2010/0050090 A1* | 2/2010 | Leebow | G06Q 10/10 715/751 |
| 2010/0060713 A1 | 3/2010 | Snyder et al. | |
| 2012/0072939 A1 | 3/2012 | Crenshaw | |
| 2014/0310058 A1 | 10/2014 | Aral et al. | |
| 2016/0042226 A1* | 2/2016 | Cunico | H04N 7/147 382/103 |

(Continued)

OTHER PUBLICATIONS

Huffington Post, [online]; [retrieved on Sep. 27, 2018]; retrieved from the Internet http://www.huffingtonpost.com/entry/contagious behaviors_us_56f400d7e4b04c4c37616f14. C. Gregoire, "7 Behaviors that are Actually Contagious, According to Science", published Mar. 26, 2016, Oath Inc.

(Continued)

*Primary Examiner* — Maria El-Zoobi
(74) *Attorney, Agent, or Firm* — Cantor Colburn LLP; Tihon Poltavets

(57) ABSTRACT

Methods, systems, and computer program products for influencing audience behavior in a presentation are provided. Aspects include receiving presentation data for a presentation on a video conference, analyzing the presentation data to identifying one or more behavior cues for a desired social contagion associated with the presentation, receiving video data for a plurality of audience members for the presentation, analyzing the video data to identifying a first audience member displaying at least one of the one or more behavior cues, and displaying the first audience member in the video conference for a first length of time.

18 Claims, 6 Drawing Sheets

(56) References Cited

U.S. PATENT DOCUMENTS

2016/0098169 A1* 4/2016 Herdy ................ G06F 3/0488
715/719
2018/0268440 A1* 9/2018 Avegliano .......... G06Q 30/0269

OTHER PUBLICATIONS

M. Papagelis et al., "Individual behavior and social influence in online social systems", HT'11 Proceedings of the 22nd ACM conference on Hypertext and hypermedia, Jun. 6-9, 2011, pp. 241-250.

* cited by examiner

BEHAVIORAL INFLUENCE SYSTEM IN SOCIALLY COLLABORATIVE TOOLS

BACKGROUND

The present invention generally relates to collaborative tools, and more specifically, to behavioral influence system in socially collaborative tools.

Business interactions today between remote users are often being dominated by software tools aimed at social collaboration. Often, these remote users may inadvertently be displayed as the focus of the collaboration based on an errant sound or noise in the background which brings the user to the focus of the screen. Keeping the sentiment and mood of a presentation consistent with the topics of the presentation can be challenging when certain users are exhibiting conflicting behavior cues. For example, during a sales pitch to a customer, displaying a user that appears bored or is yawning can be detrimental to the sales pitch when utilizing these socially collaborative tools especially if they are prominently displayed within the socially collaborative tool such as a web conference.

SUMMARY

Embodiments of the present invention are directed to a computer-implemented method for influencing audience behavior in a presentation. A non-limiting example of the computer-implemented method includes receiving presentation data for a presentation on a video conference, analyzing the presentation data to identifying one or more behavior cues for a desired social contagion associated with the presentation, receiving video data for a plurality of audience members for the presentation, analyzing the video data to identifying a first audience member displaying at least one of the one or more behavior cues, and displaying the first audience member in the video conference for a first length of time.

Embodiments of the present invention are directed to a system for influencing audience behavior in a presentation. A non-limiting example of the system includes a processor coupled to a memory, the processor configured to perform receiving presentation data for a presentation on a video conference, analyzing the presentation data to identifying one or more behavior cues for a desired social contagion associated with the presentation, receiving video data for a plurality of audience members for the presentation, analyzing the video data to identifying a first audience member displaying at least one of the one or more behavior cues, and displaying the first audience member in the video conference for a first length of time.

Embodiments of the invention are directed to a computer program product for influencing audience behavior in a presentation, the computer program product comprising a computer readable storage medium having program instructions embodied therewith. The program instructions are executable by a processor to cause the processor to perform a method. A non-limiting example of the method receiving presentation data for a presentation on a video conference, analyzing the presentation data to identifying one or more behavior cues for a desired social contagion associated with the presentation, receiving video data for a plurality of audience members for the presentation, analyzing the video data to identifying a first audience member displaying at least one of the one or more behavior cues, and displaying the first audience member in the video conference for a first length of time.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
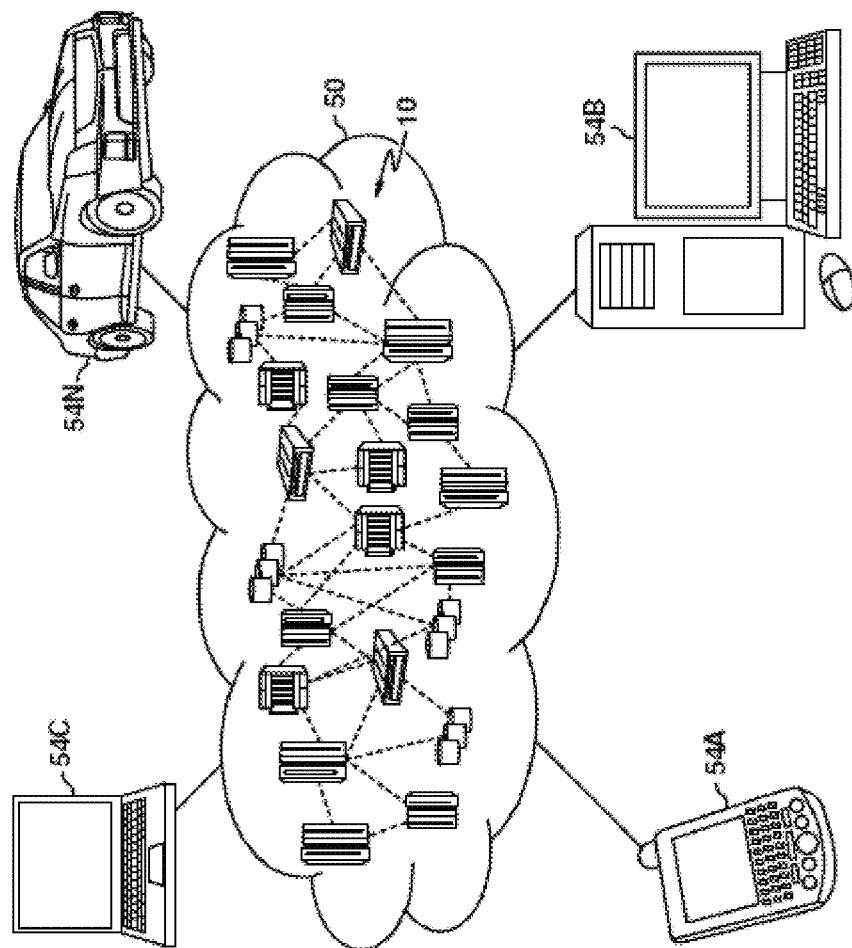
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
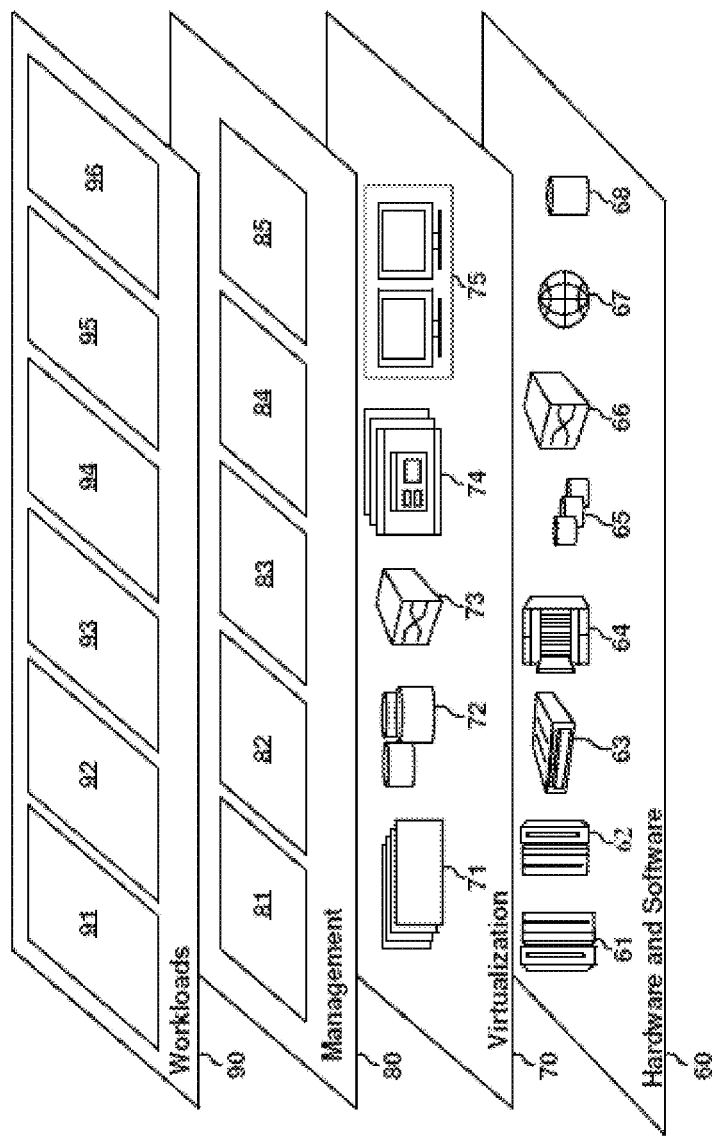
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and behavior influence in socially collaborative tools 96.

Figure 3:
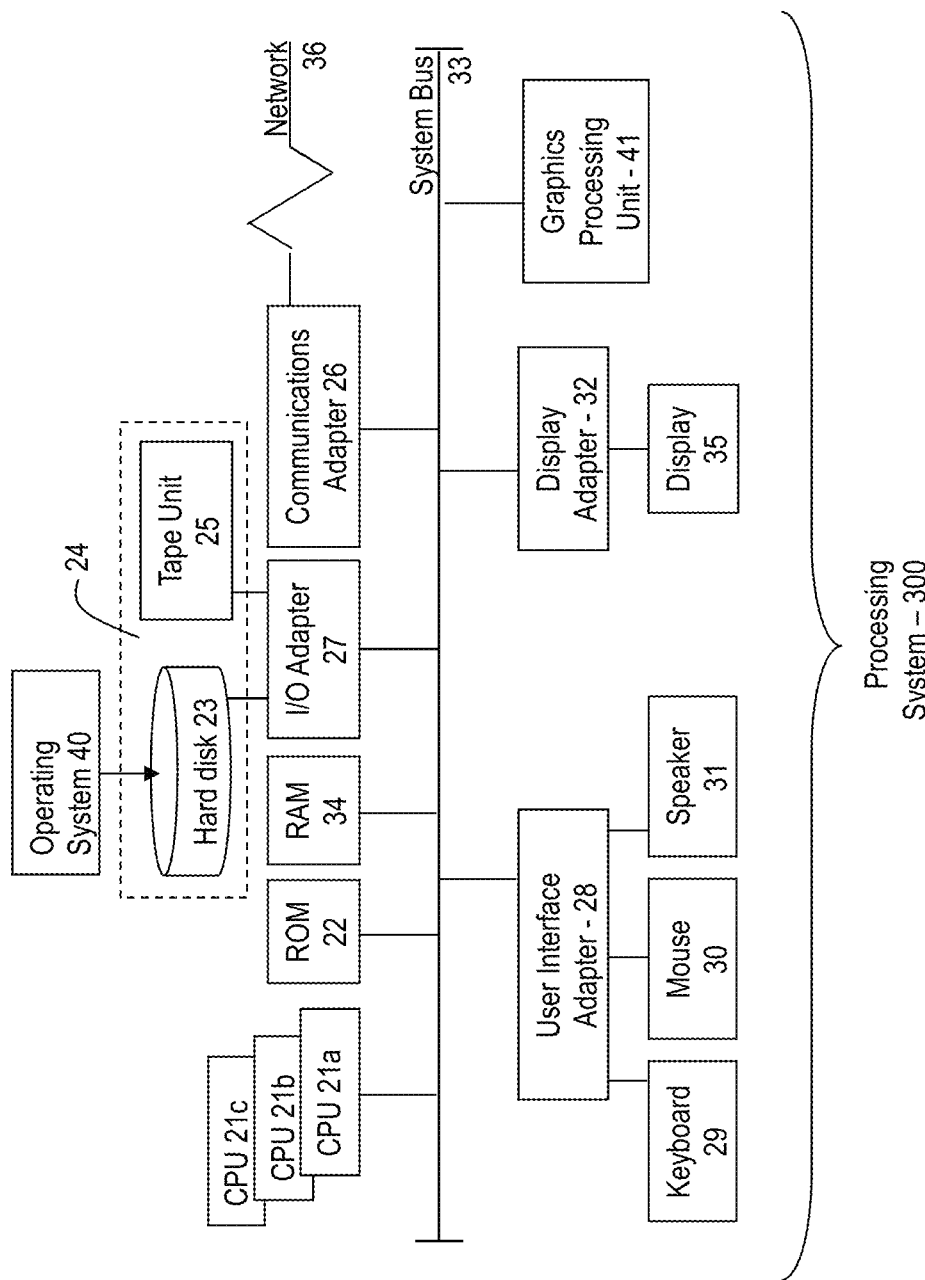
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, business interactions today with a multiple remotely located employees are increasingly utilizing social collaboration tools and video conferencing applications. Currently, these tools passively display all the users without any processing to determine how or what to display to other users beyond audio recognition to detect an active speaker. That is to say, these collaborative technologies merely listen for an audio source and display the remote user associated with the audio on the conference display without taking into consideration any social interactions between all the users.

Social interactions have an element of behavioral contagion where a specific gesture and/or expression such as a smile can have an "infectious" effect within the group of remote users on a video conference. This infectious effect can cause other users to mirror the gesture and/or expression.

Turning now to an overview of the aspects of the invention, one or more embodiments of the invention address the above-described shortcomings of the prior art by providing a system and process that influences the mood and behavior of multiple participants in a social/collaborative tool. Embodiments of the invention include a system that analyzes participants that are using a socially collaborative tool such as a video or web conference. During the conference, the system selects individuals to display to specific users with the greatest probability of propagating the desired social behaviors for the mood and context of the conference.

Figure 4:
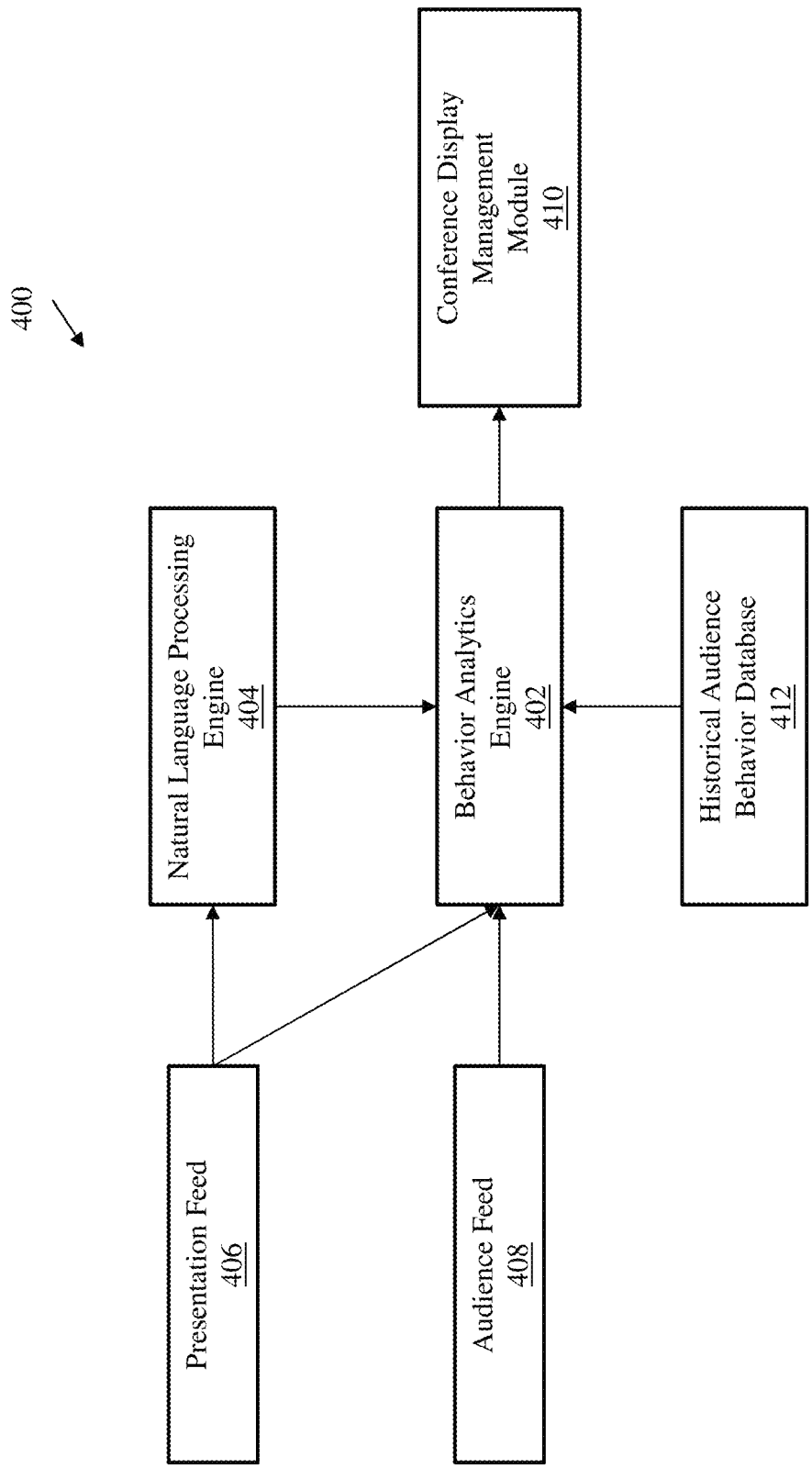
FIG. 4 depicts a block diagram of a system for influencing audience behavior in a presentation according to one or more embodiments of the invention.

Turning now to a more detailed description of aspects of the present invention, FIG. 4 depicts a system for influencing audience behavior in a presentation according to embodiments of the invention. The system 400 includes a behavior analytics engine 402, a natural language processing (NLP) engine 404, and a historical audience behavior database 412. The behavior analytics engine 402 is operable to receive both a presentation feed 406 and an audience feed 408. The feeds, in this instance, refers to both audio and video data collected by a microphone and camera for the current presenter (speaker) and for each of the audience members for the presentation. In embodiments of the invention, the term "presentation" can include any collaboration between two or more individuals either local to each other or remote to each other. For example, a presentation can include a video conference between remotely located users utilizing computing devices to communicate with each other through the use of a microphone and video that can display images on the user's computing device (e.g., computer, phone, laptop, tablet, etc.) such as, for example, a presentation slide and/or images or video of the current speaker or other users during the presentation.

In one or more embodiments of the invention, the behavior analytics engine 402 can analyze the presentation feed 406 to identifying a mood or sentiment for the presentation. The behavior analytics engine 402 can access behavior cue data that can be stored on a database that can assist with mapping the sentiment or mood for the presentation to one or more behavior cues that would propagate this desired sentiment or mood. This can be done by correlating certain words utilized in the presentation of different behavior cues. For example, the word "boring" can be associated at a high value with the behavior cue of yawning. In a business meeting, when discussing a competitors product, the speaker may state that a competitor's product has a "user interface that is boring and old." The word "boring" can be extracted using the NLP engine 404 and analyzed by the behavior analytics engine 402 to determine that the desired behavior cue that would propagate through the audience is a person yawning. Soon after the speaker's statement, an audience member displaying the behavior cue (e.g., yawning) can be selected for display on the conference screen by the conference display management module 410 during the presentation for a length of time. In addition, the other audience members' response to this behavior cue can be captured in the audience feed by the behavior analytics engine. This model could be trained against multiple crowds to establish training data or identify subtle behaviors e.g. a suppressed yawn may not be immediately identifiable but could be established alongside more easily identified yawns. This could then be used in future use cases where only stifled or suppressed yawns are found. Additionally, thresholds can be used to more or less aggressively propagate the behavior e.g. if the crowd does not respond to a subtle yawn, only show fully visual yawns.

The NLP engine 404 can perform natural language processing (NLP) analysis techniques on the audio of the presentation feed 406. NLP is utilized to derive meaning from natural language. A speech to text (STT) module can translate the audio data of the presentation to text for processing by the NLP engine 404. The NLP engine 404 can analyze the presentation audio by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by a computer to identify and generate certain keywords indicative of a mood or sentiment of the presentation. These NLP structures include a translation and/or interpretation of the natural language input, including synonymous variants thereof.

A sentiment analysis module and a tonal analysis module can be utilized by the behavior analytics engine 402 and the NLP engine 404 to determine a sentiment or mood during the presentation from the presentation feed 406 data. Any cognitive AI can be utilized within the sentiment analysis module. The sentiment analysis module can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

A tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the presenter's degree of certainty. The confidence style may be provided a value range if the text contains little or no evidence of confidence in tone or alternatively a higher value range if the style is more likely to be perceived as assured, collected, hopeful or egotistical. The tentative style may focus on the presenter's degree of inhibition. The tentative style may be provided a lower value range if the text contains little or no evidence of tentativeness in tone or a higher value range if the style is more likely to be perceived as questionable, doubtful limited, or debatable.

In one or more embodiments of the invention, the behavior analytics engine 402 determine a sentiment and mood for the presentation based on the presentation feed 406 and then select behavior cues that would affect audience members of the presentation to propagate that mood or sentiment. The audience feed 408 can be analyzed by the behavior analytics engine 402 utilize analytic techniques such as facial recognition and expression recognition to identify one or more audience members that are expressing one of the behavioral cues and/or have a high likelihood (probability) of expressing one of the behavior cues in the future. Audience members that are expressing the behavior cues at the time can be displayed as the featured image or video during the presentation by the conference display management module 410 for a length of time. The length of time can be a predetermined time period or can be based on how long the audience member is expressing the behavior cue. For example, during a customer presentation, a presenter is presenting the benefits of a particular product. During this presentation of the benefits, an audience member begins to smile which is a behavior cue that can propagate a desired social contagion (e.g., happiness, excitement, etc.). While this audience member is smiling and also during the time when the presenter is discussing the benefits of the product, this audience member is then displayed on the conference display. The other audience members are being monitored to identify another audience member that may catch the social contagion (e.g., begins smiling or begins displaying a different social cue, such as, nodding yes) and then displays this new audience member for a length of time or during the time when this new audience member is exhibiting the behavior cue.

In one or more embodiments of the invention, the behavior analytics engine 402 can analyze historical audience behavior obtained from the historical audience behavior database 412. Based on the historical audience behavior data, the behavior analytics engine 402 can determine a probability that a specific audience member will display a behavior cue during the presentation. If the probability exceeds a threshold probability (e.g., 50%, 75%), the conference display management module 410 can display this specific audience member. In embodiments of the invention, the historic audience behavior data can be tied to specific keywords extracted from the presentation feed 406. For example, when discussing a competitor, the historical data could indicate a certain employee that has a dissatisfaction with the competitor and might exhibit a frown which could become socially contagious. This frown could be a behavior cue that is tied to the mood or sentiment of the presentation regarding the competitor. Based on this, the employee could be displayed during this part of the presentation to further propagate frowning or other behavioural cues associated with the mood and/or sentiment.

In embodiments of the invention, the behavior analytics engine 402, in addition to displaying behavior cues in line with sentiment and mood of the presentation, can block the displaying of opposing behavior cues that conflict with the sentiment and mood of the presentation. For example, in a business presentation discussing a potential future business opportunity with a customer, a yawn from a current employee would be vied as unfavorable by the customer and should be hidden from view during the presentation. The conference display management module 410 could implement certain tactics to hide conflicting behavioral cues such as, for example, blanking any images of the audience member exhibiting the conflicting behavior cues, zooming out or away from the audience member exhibiting the conflicting behavior cues, shifting a focus to a slide of the presentation or to another audience member exhibiting a desired behavior cue.

In embodiments of the invention, the behavioral cue data can be weighted such that certain behavioral cues have stronger contagious effects. For example, for presentation moods and sentiment that are happy or energetic, behavior cues can include smiling, laughing, or other indications of happiness and/or excitement. A laugh can be weighted higher than smiling and the behavior analytics engine 402 can utilize a weighted score to determine which audience member to display when there are more than one desired behavioral cues being exhibited by multiple audience members.

In embodiments of the invention, the engines 402, 404 described herein can also be implemented as so-called classifiers (described in more detail below). In one or more embodiments of the invention, the features of the various engines/classifiers (402, 404) described herein can be implemented on the processing system 300 shown in FIG. 3, or can be implemented on a neural network (not shown). In embodiments of the invention, the features of the engines/classifiers 402, 404 can be implemented by configuring and arranging the processing system 300 to execute machine learning (ML) algorithms. In general, ML algorithms, in effect, extract features from received data (e.g., inputs to the engines 402, 404) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402, 404 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402, 404 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

In embodiments of the invention, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

Figure 5:
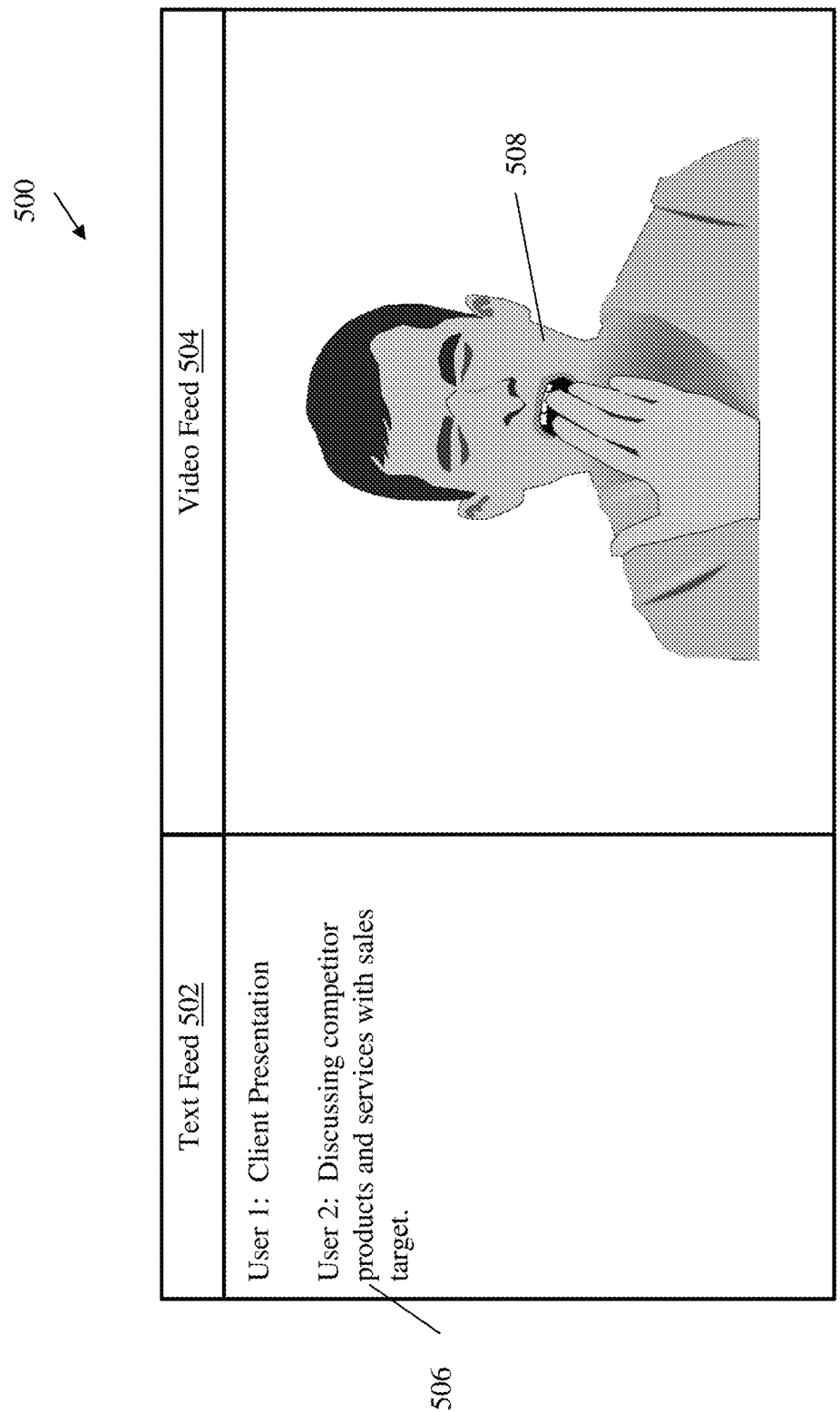
FIG. 5 depicts a diagram of an exemplary collaborative tool according to one or more embodiments of the invention.

FIG. 5 depicts a diagram of an exemplary collaborative tool according to one or more embodiments of the invention. The collaborative tool 500 includes a graphical user interface (GUI) that can be displayed on a presentation screen or on a display screen for user such as a computer monitor, smartphone display screen, and the like. The GUI includes a text feed 502 and a video feed 504. The text feed 502 can be utilized for presentation, discussion, and/or questions during a collaborative meeting. The text feed 502 can be utilized in conjunction with an audio feed for the collaborative meeting. The video feed 504 can display presentation materials and can also present audience members of the collaborative meeting. In the text feed 502, a user 2 is discussing competitor products and services with a sales target 506. The behavior analytics engine 402 can utilize this topic to identify audience members responding with appropriate behavioral cues, such as yawning, and display the audience members who are yawning 508 in the video feed 504.

Figure 6:
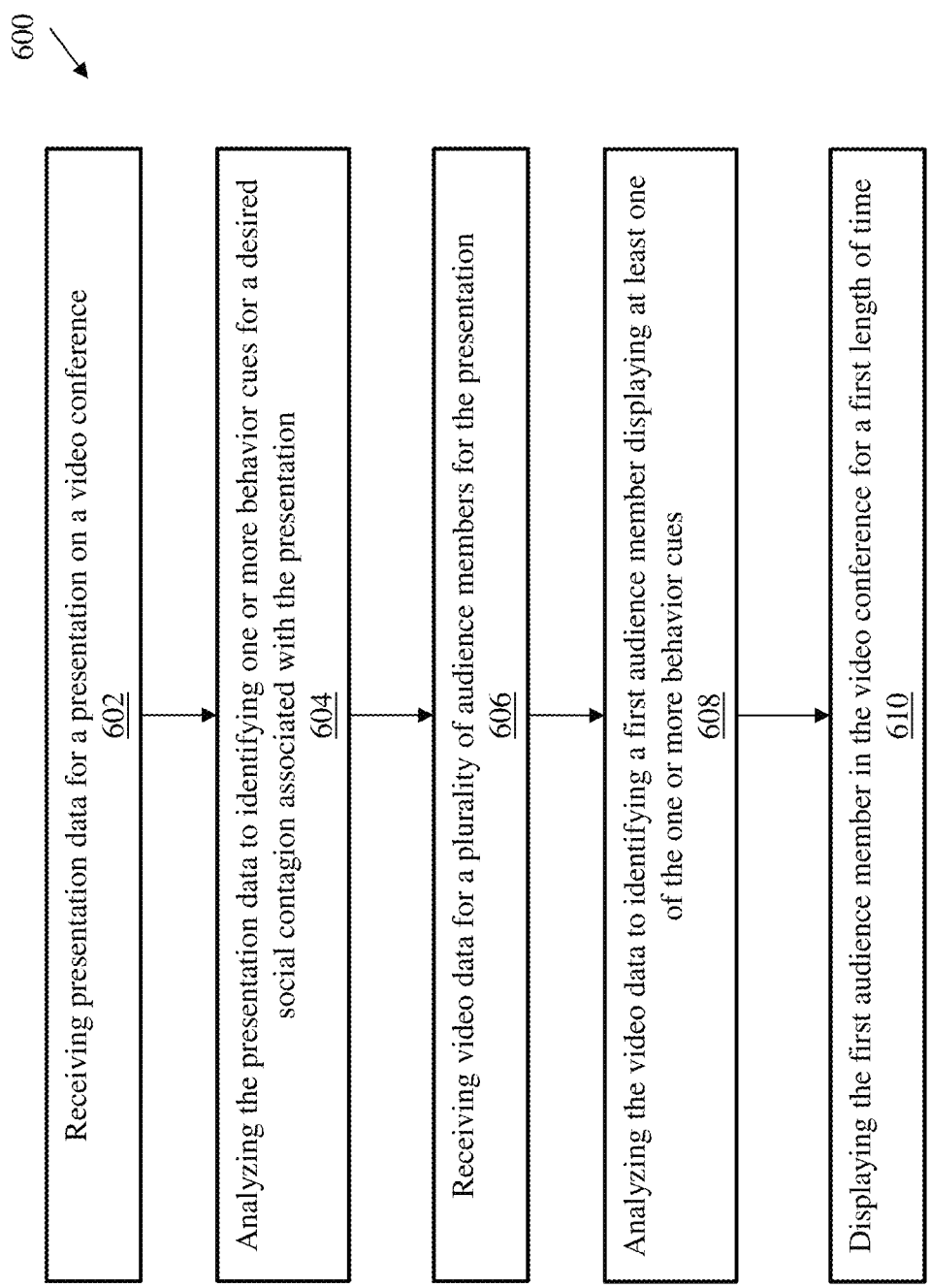
FIG. 6 depicts a flow diagram of a method for influencing audience behavior in a presentation according to one or more embodiments of the invention.

FIG. 6 depicts a flow diagram of a method for influencing audience behavior in a presentation according to one or more embodiments of the invention. The method 600 includes receiving presentation data for a presentation on a video conference, as shown at block 602. Then, at block 604, the method 600 includes analyzing the presentation data to identifying one or more behavior cues for a desired social contagion associated with the presentation. The method 600, at block 606, includes receiving video data for a plurality of audience members for the presentation. Then, the method 600 includes analyzing the video data to identifying a first audience member displaying at least one of the one or more behavior cues, as shown at block 608. And at block 610, the method 600 includes displaying the first audience member in the video conference for a first length of time.

Additional processes may also be included. It should be understood that the processes depicted in FIG. 6 represent illustrations, and that other processes may be added or existing processes may be removed, modified, or rearranged without departing from the scope and spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for influencing audience behavior in a presentation, the method comprising:
    receiving presentation data associated with a presentation over a video conference, wherein the presentation data comprises visual and audio content associated with the presentation, and wherein the presentation data further comprises audio data associated with a presenter associated with the presentation;
    analyzing the visual and audio content to determine a desired social contagion, wherein determining the desired social contagion comprises:
        determining the desired social contagion based on a feature vector, generated by a machine learning model, comprising a plurality of features extracted from the audio data;
        retrieving behavior cue data comprising a plurality of behavior cues; and
        comparing the desired social contagion to the behavior cue data to select the one or more behavior cues for the desired social contagion;

determining one or more behavior cues that elicit the desired social contagion;

receiving video data for a plurality of audience members for the presentation;

analyzing the video data to identifying a first audience member displaying at least one of the one or more behavior cues;

displaying the first audience member in the video conference for a first length of time.

2. The computer-implemented method of claim 1, further comprising:

collecting additional video data for the plurality of audience members for the presentation during the first length of time;

analyzing the additional video data to determine that the desired social contagion associated with the presentation is being displayed by a second audience member in the plurality of audience members; and displaying the second audience member for a second period of time.

3. The computer-implemented method of claim 1, further comprising:

analyzing video data of the first audience member during the first length of time; and ceasing displaying the first audience member in the video conference based on determining the first audience member is not displaying at least one of the one or more behavior cues.

4. The computer-implemented method of claim 1, further comprising:

receiving historical data associated with the plurality of audience members;

analyze the historical data to determine a probability for a third audience member in the plurality of audience members to exhibit the one or more behavior cues; and displaying the third audience member in the video conference for a third length of time based at least in part on the probability exceeding a threshold probability.

5. The computer-implemented method of claim 4, further comprising:

monitoring video data of the third audience member during the third length of time to determine whether the third audience member displays the one or more behavior cues; and updating the historical data based on a determination that the third audience member displayed at least one of the one or more behavior cues during the third length of time.

6. The computer-implemented method of claim 5, further comprising:

updating the historical data based on a determination that the third audience member did not displayed the one or more behavior cues during the third length of time.

7. A system for influencing audience behavior in a presentation, the system comprising:

a processor coupled to a memory, the processor configured to:

receive presentation data associated with a presentation over a video conference, wherein the presentation data comprises visual and audio content associated with the presentation, and wherein the presentation data further comprises audio data associated with a presenter associated with the presentation;

analyze the visual and audio content to determine a desired social contagion, wherein determining the desired social contagion comprises:

determining the desired social contagion based on a feature vector, generated by a machine learning model, comprising a plurality of features extracted from the audio data;

retrieving behavior cue data comprising a plurality of behavior cues; and comparing the desired social contagion to the behavior cue data to select the one or more behavior cues for the desired social contagion;

determine one or more behavior cues that elicit the desired social contagion;

receive video data for a plurality of audience members for the presentation;

analyze the video data to identifying a first audience member displaying at least one of the one or more behavior cues;

display the first audience member in the video conference for a first length of time.

8. The system of claim 7, wherein the processor is further configured to:

collect additional video data for the plurality of audience members for the presentation during the first length of time;

analyze the additional video data to determine that the desired social contagion associated with the presentation is being displayed by a second audience member in the plurality of audience members; and display the second audience member for a second period of time.

9. The system of claim 7, wherein the processor is further configured to:

analyze video data of the first audience member during the first length of time; and cease displaying the first audience member in the video conference based on determining the first audience member is not displaying at least one of the one or more behavior cues.

10. The system of claim 7, wherein the processor is further configured to:

receive historical data associated with the plurality of audience members;

analyze the historical data to determine a probability for a third audience member in the plurality of audience members to exhibit the one or more behavior cues; and display the third audience member in the video conference for a third length of time based at least in part on the probability exceeding a threshold probability.

11. The system of claim 10, wherein the processor is further configured to:

monitor video data of the third audience member during the third length of time to determine whether the third audience member displays the one or more behavior cues; and update the historical data based on a determination that the third audience member displayed at least one of the one or more behavior cues during the third length of time.

12. The system of claim 11, wherein the processor is further configured to:

update the historical data based on a determination that the third audience member did not displayed the one or more behavior cues during the third length of time.

13. A computer program product for influencing audience behavior in a presentation the computer program product comprising a computer readable storage medium having program instructions embodied therewith, wherein the computer readable storage medium is not a transitory signal per se, the program instructions executable by a processor to cause the processor to perform a method comprising:

receiving presentation data associated with a presentation over a video conference, wherein the presentation data comprises visual and audio content associated with the presentation, and wherein the presentation data further comprises audio data associated with a presenter associated with the presentation;

analyzing the visual and audio content to determine a desired social contagion, wherein determining the desired social contagion comprises:

determining the desired social contagion based on a feature vector, generated by a machine learning model, comprising a plurality of features extracted from the audio data;

retrieving behavior cue data comprising a plurality of behavior cues; and comparing the desired social contagion to the behavior cue data to select the one or more behavior cues for the desired social contagion;

determining one or more behavior cues that elicit the desired social contagion;

receiving video data for a plurality of audience members for the presentation;

analyzing the video data to identifying a first audience member displaying at least one of the one or more behavior cues;

displaying the first audience member in the video conference for a first length of time.

14. The computer program product of claim 13, further comprising:

collecting additional video data for the plurality of audience members for the presentation during the first length of time;

analyzing the additional video data to determine that the desired social contagion associated with the presentation is being displayed by a second audience member in the plurality of audience members; and displaying the second audience member for a second period of time.

15. The computer program product of claim 13, further comprising:

analyzing video data of the first audience member during the first length of time; and ceasing displaying the first audience member in the video conference based on determining the first audience member is not displaying at least one of the one or more behavior cues.

16. The computer program product of claim 13, further comprising:

receiving historical data associated with the plurality of audience members;

analyze the historical data to determine a probability for a third audience member in the plurality of audience members to exhibit the one or more behavior cues; and displaying the third audience member in the video conference for a third length of time based at least in part on the probability exceeding a threshold probability.

17. The computer program product of claim 16, further comprising:

monitoring video data of the third audience member during the third length of time to determine whether the third audience member displays the one or more behavior cues; and updating the historical data based on a determination that the third audience member displayed at least one of the one or more behavior cues during the third length of time.

18. The computer program product of claim 17, further comprising:

updating the historical data based on a determination that the third audience member did not displayed the one or more behavior cues during the third length of time.

* * * * *